March 4, 1958     CHING C. LOO ET AL     2,825,651
IN-PACKAGE OXYGEN REMOVER
Filed July 1, 1957
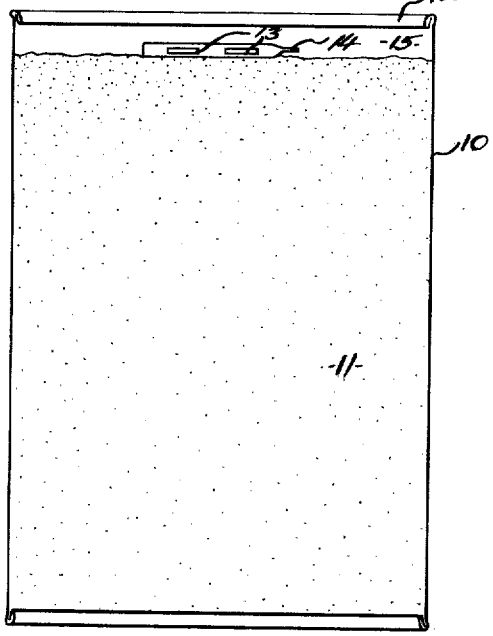
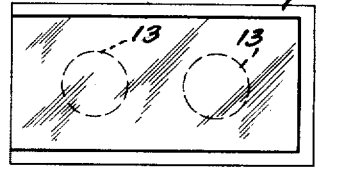
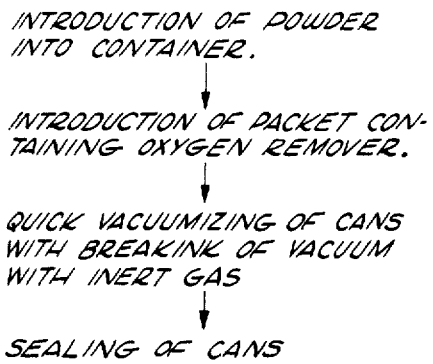
FIG. 3.
INTRODUCTION OF POWDER INTO CONTAINER.
↓
INTRODUCTION OF PACKET CONTAINING OXYGEN REMOVER.
↓
QUICK VACUUMIZING OF CANS WITH BREAKING OF VACUUM WITH INERT GAS
↓
SEALING OF CANS
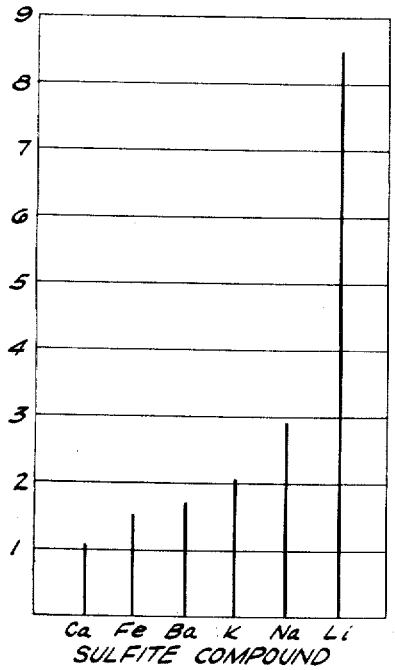
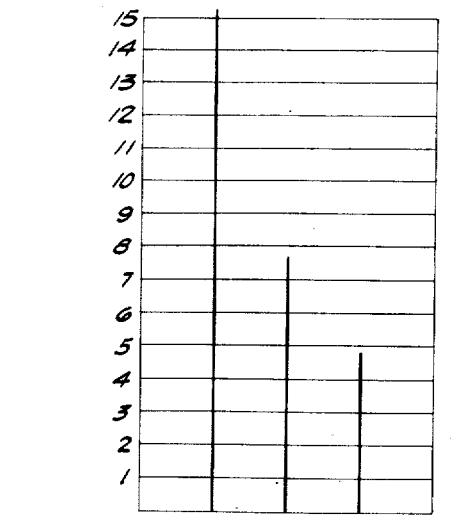
INVENTOR.
CHING C LOO
WILLIAM P JACKSON
BY
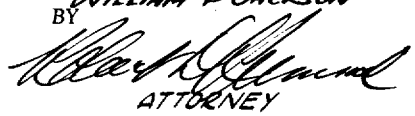
ATTORNEY United States Patent Office 2,825,651
Patented Mar. 4, 1958

2,825,651

IN-PACKAGE OXYGEN REMOVER

Ching C. Loo, Sepulveda, and William P. Jackson, Chatsworth, Calif., assignors to Carnation Company, Los Angeles, Calif., a corporation of Delaware Application July 1, 1957, Serial No. 669,124

16 Claims. (Cl. 99—171)

The present invention relates to an in-package oxygen remover for packaged dry products which are susceptible to deterioration due to the presence of free and/or combined oxygen.

The oxidation of certain constituents of packaged dehydrated foods seriously limits the utilization of such foods. For instance, the butter fat content of a dry whole milk product becomes readily oxidized in the presence of free oxygen and as a result the flavor and quality of the product may fall off by reason of this oxidation and the product may be unusable as far as the consumer is concerned. With respect to a product such as dry whole milk, various processes have been attempted in order to compensate for this problem or in order to minimize the amount of free oxygen in the sealed container when the package is marketed. One method commonly employed at the present time is to subject the powder to a high vacuum over an extended period of time in an effort to remove both the free oxygen from the interstices between the particles of the product and the oxygen which may be occluded in the product particles. On a commercial basis, it is substantially impossible, because of cost, to create a perfect vacuum in the product can. It is common practice, therefore, after the vacuumizing step or treatment, to flush with an inert gas such as nitrogen or carbon dioxide and this flushing operation is continued for a period of time sufficient to remove all but a trace of the oxygen. Here again the amount of oxygen still contained in the can after the flushing treatment is dependent upon the length of time the product is flushed by this inert gas and, of course, the amount of inert gas which can be flushed through the product is limited to the extent that protracted treatment makes the process difficult as well as commercially too expensive.

It is known that a solution of a sulfite salt plus an accelerator is effective for oxygen removing purposes, however, no one has heretofore adapted this known chemical reaction for oxygen removing purposes for a dehydrated or dry product. Obviously, a reaction which is dependent upon the reactors being in solution has no utilization as an oxygen removing agent in a dry packaged product. We, however, have discovered that a sulfite salt and an accelerator such as, for instance copper sulfate pentahydrate, can be so intermixed as to be extremely effective as an in-package oxygen remover, as will be more fully explained hereinafter. Anhydrous sodium sulfite does not work by itself and a hydrated sodium sulfite is too active to handle conveniently. The action in the above example is triggered by the copper ions of the copper sulfate pentahydrate. Also, as will be more fully brought out hereinafter, simple blending of the copper sulfate pentahydrate with the anhydrous sodium sulfite will not trigger the reaction. These two reagents must be brought into imminent contact, either by grinding them together or by compressing them into a pellet, before the reaction will be triggered to the extent that the mixture will be an effective oxygen remover.

It is, therefore, a primary object of the present invention to provide a novel in-packaged oxygen remover which is highly effective for use with packaged food products.

A further object of the present invention is to provide an oxygen removing agent which consists of a sulfite salt in intermixture with an agent having a metallic ion.

A still further object of the present invention is to provide an oxygen remover which consists of a sulfite salt pelletized with an agent having a metallic ion.

Another object of the present invention is to provide an oxygen remover which will avoid extended treatment of the product prior to the packaging or sealing operation and which will effectively remove the remaining free or occluded oxygen from the sealed package.

A still further object of the present invention is to provide an improved method for oxygen-free packaging of dry products.

Additional objects and features of the invention will appear from the following description in which the preferred embodiment has been set forth in detail with the accompanying drawing.

Referring to the drawing:

Fig. 1 is a side elevational view in section showing a sealed container containing a quantity of dry food products and provided with a packet for the removal of free oxygen.

Fig. 2 is a plan view showing the packet illustrated in Fig. 1, slightly enlarged.

Fig. 3 is a flow sheet illustrating one way in which the in-packaged oxygen remover of the present invention can be utilized in packing a dry food product.

Fig. 4 is a graph showing the ml. of oxygen removed by 10 m. eq. of various specified sulfite reactants in five hours, 4 m. eq. of copper sulfate pentahydrate being used as the accelerator.

Fig. 5 is a graph disclosing the ml. of oxygen removed by 8 m. eq. of sodium sulfite with 10 m. eq. of certain specified accelerator in five hours.

In accordance with the present invention, we employ the oxidation of $SO_3^-$ to $SO_4^-$ in the presence of a metallic ion which acts an an accelerator for the removal of free oxygen from a powdered product such as, for instance, dry whole milk. The oxidation reaction of the sulfite is carried out after the product has been placed in a suitable container such as, for instance, a tin can, vacuumized, flushed with an inert gas and then sealed with the in-package oxygen remover of present invention enclosed in the container. The oxygen remover is carried in a suitable packet or envelope and it will be appreciated that the envelope is formed of any suitable material which will permit the passage of gas therethrough and that it avoids direct contact of the dry food material with the oxygen remover, which with respect to food products is absolutely essential.

A typical example of a package of this type is disclosed in Fig. 1, wherein a metal container or tin can it designated by the number 10. The product is designated by the number 11 and the container lid is designated by the number 12. The oxygen remover of the present invention in this instance is shown in the form of a pellet 13, which is enclosed in a suitable envelope or packet 14. It will be noted that the envelope 14 is placed in the head space 15 of the container and in some instances it may be preferable to affix the envelope to the lid so as to carry the same out of contact with the product.

As has been previously suggested, the sulfite in the presence of an accelerator while in solution will act as an oxygen remover or, in other words, the sulfite radical will oxidize to the sulfate radical. Heretofore, however, no one has been able to utilize this basic reaction for oxygen removing purposes with these reagents being in their dry form and, consequently, the reaction has never been able to be utilized as an in-package oxygen remover for dehydrated or dry foods.

Sodium sulfite in its normal dry form is a granular product. Copper sulfate pentahydrate in its normal dry form also has a granular characteristic. It has been claimed that when these two reactants are in solution, the oxidation of sodium sulfite with copper sulfate pentahydrate as the accelerator will be as follows:

(1) $SO_3^- + CU^{++}$ ———————————— $SO_3^- + CU^+$
(2) $SO_3^- + O_2$ ———————————— $SO_5^-$
(3) $SO_5^- + SO_3^-$ ———————————— $SO_5^- + SO_3^-$
(4) $SO_5^- + SO_3^-$ ———————————— $2SO_4^-$

If these two products are intermixed in their normal dry state, the reaction will not be triggered, or in other words, the sulfite radical will not be oxidized to the sulfate radical. If, however, these two reactants are ground together so that there is substantial surface contact of the two reactants, such as for instance the particle size of each reactant being of the order of substantially 100 microns, and the intermixed product retained in intimate relationship, the reaction will take place. The reaction can also be triggered if the two reactants are intermixed and then subjected to a pressure of substantially 28,000 p. s. i. so as to form a pellet. Here again the individual particles of each reactant are brought into intimate contact and, prior to pelletizing, it is preferable to grind the reactants together so that their particles size is of the order of about 100 microns. In the formation of the pellet, glycerin may be added as a binder, which was found to have no retarding effect upon the reactants.

It is assumed that the oxidation of the sulfite radical after the dry reactants have been intermixed with one another is substantially the same as the scheme specified above when these reactants are in solution. In any event, it has been found that when 1 gram of sodium sulfite is intimately intermixed with 2 grams of copper sulfate pentahydrate, substantially all of the oxygen trapped in a sealed No. 411 can of dry whole milk after the same has been subjected to vacuumizing and flushing by an inert gas will be removed in approximately two hours.

It will be appreciated that any sulfite salt which will easily and readily oxidize to a sulfate in the presence of oxygen can be used as an oxygen removing agent in accordance with the principles of the present invention. Examples of such sulfite salts are as follows:

$Li_2SO_3.H_2O$        $Na_2SO_3$
$K_2SO_3.2H_2O$        $BaSO_3$
$FeSO_3.3H_2O$         $CaSO_3.2H_2O$

It will also be appreciated that accelerators other than copper sulfate pentahydrate can be used for triggering the oxidation of any of the above sufite salts.

For example, in referring now specifically to Figs. 4 and 5, it will be seen that 10 m. eq. of the sulfite of lithium and 4 m. eq. of copper sulfate pentahydrate pelletized, as described with reference to sodium sulfite, removes 8½ ml. of oxygen in five hours. It will also be noted that the sulfite of sodium removed 2.75 ml. of oxygen, the sulfite of potassium removed over 2 ml. of oxygen, the sulfite of barium removed over 1½ ml. of oxygen, the sulfite of iron removed slightly more than 1½ ml. of oxygen, and the sulfite of calcium removed slightly over 1 ml. of oxygen. It will also be noted that 8 m. eq. of sodium sulfite with 10 m. eq. of cobaltous oxide pelletized removed 15 plus ml. of oxygen, whereas 8 m. eq. of sodium sulfite pelletized with 10 m. eq. of copper sulfate pentahydrate removed 7½ ml. of oxygen. When the 8 m. eq. of sodium sulfite is pelletized with 10 m. eq. of stannous chloride, slightly more than 4½ ml. of oxygen is removed.

It will be appreciated that in every combination of one of the above sulfite salts with one of the above accelerators, either the accelerator or the sulfite salt must have one or more molecules of water crystallization. In the above reaction, since cobaltous oxide and stannous chloride have no water of crystallization, the sodium sulfite employed is sodium sulfite heptahydrate. Technically, therefore, the reaction which occurs when these reagents are in solution form probably occurs in micro solutions, however, certain metallic salts were tried which had a high water of crystallization count which did not function as accelerators. The secret of obtaining this reaction, however, when the reactants are in dry form with, of course, one or more molecules of water crystallization, is the intimate intermixture of the two reactants. As previously suggested, the particle size of each reactant is preferably on or about substantially 100 microns and the reactants are preferably compressed into pellet form so that the individual particles of each of the reactants are in extremely close intimate relationship. Also, as previously suggested, if the reactants are not in such intimate relationship, the reaction will not take place and the combination cannot be used for oxygen removing purposes.

A typical can for packaging a dry food product such as, for instance, whole milk is the 502 x 514 key opening type and this can will hold approximately 480 grams of milk powder. The air in the void spaces will contain approximately 257 ml. of oxygen, a substantial portion of which is removed during the vacuumizing and flushing operations. The following quantities of the various sulfite salts, when pelletized with an equal amount of copper sulfate pentahydrate as an accelerator, will theoretically remove 257 ml. of oxygen.

|  | Grams |
| --- | --- |
| $Li_2SO_3.H_2O$ | 2.69 |
| $NA_2SO_3$ | 3.02 |
| $K_2SO_3.2H_2O$ | 4.66 |
| $BaSO_3$ | 5.2 |
| $FeSO_3.3H_2O$ | 4.55 |
| $CaSO_3.2H_2O$ | 3.71 |

In summary, therefore, it is well known, as previously suggested, that a solution of a sulfite salt plus an accelerator is effective for oxygen removing purposes. Because this reaction takes place in solution form, it has heretofore never been available for use with dry food products. The present invention is specifically directed toward the utilization of this reaction when the agents are in their dry form and is specifically directed to the intimate intermixture of a sulfite salt and its accelerator. As previously suggested, these two agents are preferably brought into intimate contact in pellet form after they have both been ground to a size of the order of substantially 100 microns. A further feature of this invention is the utilization of this oxygen remover agent in the packaging of dry food product and specifically the provision of incorporating the oxygen remover in the head space of a sealed package of food after the same has been vacuumized and flushed with an inert gas. As previously suggested, the envelope is formed of such material as to readily permit the passage of a gas therethrough while at the same time protecting the food from coming in direct contact with the oxygen remover carried in the envelope.

Fig. 3 illustrates a complete procedure whereby the oxygen remover can be employed in a method of packaging a dry food product such as whole milk. As indicated, immediately after dry milk is introduced into the container or can, the envelope containing the oxygen removing agent is inserted or placed in the can and the can is then quickly vacuumized to remove the bulk of the air, after which the vacuum is broken with an inert gas-like nitrogen. The can is then sealed.

It will be appreciated that in addition to the preservation of whole milk powder, it is evident that the invention can be applied to a wide variety of dry food products. For example, it can be applied to such products as powdered ice cream mixes, creams, dried milk solids containing vegetable fats, powdered soup stocks and powdered cake or bakery mixes containing cereal flour and a fat with or without milk solids. The invention can also be applied to non-food products such as packaged machine parts so as to prevent the oxidation of products of this type.

What is claimed is:

1. An oxygen remover comprising an intimate intermixture of a sulfite salt which will readily oxidize to a sulfate in the presence of oxygen and an accelerator having an available metal ion which will react with the sulfite ion in the presence of oxygen, at least one of these reactants having one or more molecules of water of crystallization.

2. An oxygen remover comprising an intimate intermixture of a hydrate salt having an available sulfite ion which will readily oxidize into a sulfate ion and an anhydrous accelerator having an available metal ion which will react with the sulfite ion in the presence of oxygen.

3. An oxygen remover comprising an intimate intermixture of an anhydrous salt having an available sulfite ion which will readily oxidize into a sulfate ion in the presence of oxygen and a hydrated accelerator having an available metal ion which will trigger the oxidation of the sulfite ion.

4. The invention defined in claim 1, wherein the sulfite salt is sodium sulfite.

5. The invention defined in claim 1, wherein the sulfite salt is lithium sulfite.

6. The invention defined in claim 1, wherein the sulfite salt is potassium sulfite.

7. The invention defined in claim 1, wherein the sulfite salt is ferric sulfite.

8. The invention defined in claim 1, wherein the sulfite salt is calcium sulfite.

9. The invention defined in claim 1, wherein the accelerator is copper sulfate pentahydrate.

10. The invention defined in claim 1, wherein the accelerator is cobaltous oxide.

11. The invention defined in claim 1, wherein the accelerator is stannous chloride.

12. The invention defined in claim 1, wherein the particle size of the sulfite salt and the particle size of the accelerator are in the order of substantially 100 microns.

13. The invention defined in claim 12, wherein the intermixture is compressed into the form of a pellet.

14. In a process for the preservation of a food product in powdered form, the product being susceptible to deterioration by oxidation, the steps of introducing the dry powdered product into a container, adding to the container a measured amount of a mixture comprising a sulfite salt which is susceptible to oxidation and will oxidize into a sulfate salt and an accelerator having free metal ions for triggering the action, at least one of these reactants having one or more molecules of water of crystallization, vacuumizing the container and the product contained therein, to remove the bulk of the free oxygen in the container, flushing the inside of the container and the product contained therein with an inert gas to remove all but a trace of the oxygen therein, and then sealing the container so that the free oxygen still retained in the container after the vacuumizing and flushing treatment will be removed by said mixture.

15. The process defined in claim 14 further characterized by the mixture being in the form of a pellet.

16. The process defined in claim 14 further characterized by said mixture being carried in a permeable packet.

References Cited in the file of this patent

UNITED STATES PATENTS 1,584,903     Supplee _____ May 28, 1926

U. S. DEPARTMENT OF COMMERCE
PATENT OFFICE

CERTIFICATE OF CORRECTION

Patent No. 2,825,651     Ching C. Loo et al.     March 4, 1958

It is hereby certified that error appears in the printed specification of the above numbered patent requiring correction and that the said Letters Patent should read as corrected below.

Column 5, line 37, for "ferric sulfite" read --ferrous sulfite--.

Signed and sealed this 10th day of June 1958.

(SEAL)
Attest:
KARL H. AXLINE
Attesting Officer

ROBERT C. WATSON
Commissioner of Patents